US010382267B2

(12) United States Patent
Balakrishnan et al.

(10) Patent No.: US 10,382,267 B2
(45) Date of Patent: *Aug. 13, 2019

(54) MANAGING SERVERS WITH QUALITY OF SERVICE ASSURANCES

(71) Applicant: International Business Machines Corporation, Armonk, NY (US)

(72) Inventors: Ganesh Balakrishnan, Austin, TX (US); Mohammad Peyravian, Cary, NC (US); Srinivasan Ramani, Cary, NC (US); Brian M. Rogers, Durham, NC (US); Ken V. Vu, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/872,112

(22) Filed: Jan. 16, 2018

(65) Prior Publication Data

US 2018/0139094 A1 May 17, 2018

Related U.S. Application Data

(63) Continuation of application No. 14/656,816, filed on Mar. 13, 2015, now Pat. No. 9,948,513.

(51) Int. Cl.
*H04L 12/24* (2006.01)
*H04L 12/927* (2013.01)
*H04L 29/08* (2006.01)

(52) U.S. Cl.
CPC ...... *H04L 41/0833* (2013.01); *H04L 41/0893* (2013.01); *H04L 47/805* (2013.01);
(Continued)

(58) Field of Classification Search
CPC . H04L 41/0833; H04L 41/0893; H04L 67/10; H04L 67/1008; H04L 67/322; H04L 67/1023; H04L 47/805; Y02B 60/33
See application file for complete search history.

(56) References Cited

U.S. PATENT DOCUMENTS

| 9,948,513 B2 * | 4/2018 | Balakrishnan | ...... H04L 41/0833 |
| 2006/0288119 A1 * | 12/2006 | Kim | ...... H04L 67/2814 |
| | | | 709/238 |

(Continued)

OTHER PUBLICATIONS

Horvath et al., "Enhancing Energy Efficiency in Multi-tier Web Server Clusters via Prioritization," IEEE International Parallel and Distributed Processing Symposium, Mar. 2007, pp. 1-6, Copyright © 2007 IEEE DOI: 10.1109/IPDPS.2007.370509.
(Continued)

*Primary Examiner* — Kim T Nguyen
(74) *Attorney, Agent, or Firm* — Robert J. Shatto

(57) ABSTRACT

Aspects of an embodiment of the invention disclose a method, computer program product, and system for managing the energy efficiency of servers providing multi-class computing services with Quality of Service (QoS) assurance. Computing resources are clustered into at least three groups, where each group has a separate power management policy (PMP). A plurality of requests are received from a plurality of devices, and are sorted into at least three service classes based on the requests' QoS criteria. Each request is assigned to one of at least three service queues based on the request's service class, and each service group is processed by a group of computing resources. The power management policies are configured such that each group of computing resources may service requests at an energy efficient point while meeting the QoS criteria of the service class.

16 Claims, 6 Drawing Sheets

(52) U.S. Cl.
CPC ...... *H04L 67/1008* (2013.01); *H04L 67/1023* (2013.01); *H04L 67/322* (2013.01)

(56) References Cited

U.S. PATENT DOCUMENTS

| | | |
|---|---|---|
| 2009/0187782 A1 | 7/2009 | Greene et al. |
| 2011/0173478 A1 | 7/2011 | Li et al. |
| 2011/0178652 A1 | 7/2011 | Carter et al. |
| 2011/0289330 A1 | 11/2011 | Gao et al. |
| 2011/0296212 A1 | 12/2011 | Elnozahy et al. |
| 2012/0227048 A1 | 9/2012 | Elnozahy et al. |
| 2014/0298061 A1* | 10/2014 | Volvovski ............. G06F 3/0625 713/323 |
| 2016/0269240 A1 | 9/2016 | Balakrishnan et al. |

OTHER PUBLICATIONS

Unknown, "Energy and environment: Overview," IBM, 2 pages, accessed Dec. 17, 2014 http://www.ibm.com/ibm/green.

Unknown, "Linux information for IBM systems," IBM Knowledge Center, accessed Mar. 12, 2015, © Copyright IBM Corporation 2002, 2014, http://www-01.ibm.com/support/knowledgecenter/linuxonibm/liaab/ic-homepage.htm, 1 pg.

List of IBM Patents or Patent Applications Treated as Related, Jan. 16, 2018, 2 pgs.

Mell et al., "The NIST Definition of Cloud Computing," Recommendations of the National Institute of Standards and Technology, U.S. Department of Commerce, Special Publication 800-145, Sep. 2011, 7 pgs.

* cited by examiner

MANAGING SERVERS WITH QUALITY OF SERVICE ASSURANCES

BACKGROUND

The present disclosure relates generally to the field of server computing, and more particularly to managing the energy efficiency of servers providing multi-class computing services.

Server admins have a number of resources available to balance the energy efficiency of a server with the processing capabilities. Server admins may set power management policies to match processing requirements, and the policies in turn may use features such as dynamic voltage and frequency scaling (DVFS) as to raise or lower the voltage and frequency of a server's processor to adjust power consumption. Modern processors may also have low power modes, such as nap or sleep modes, which can be utilized to decrease the energy demand when the server is at idle. Additionally, many modern processors are multi-core processors that can accommodate consolidation of work onto a subset of the cores. This may be called core folding or core parking or other names that convey the consolidation of work. Core folding policy, when enabled, allows the operating system or privileged system software to consolidate the server's work into fewer cores, and unused cores can be turned off or placed in a low power mode to decrease the server's energy demand.

Modern mobile devices, such as smart phones and tablets, have applications with a wide range of Quality of Service (QoS) requirements. Some applications, including online gaming and video streaming, may require an almost instantaneous response. Other applications, like printing services and file downloads, may not be processed by a server for several seconds with little to no impact on the user's experience.

SUMMARY

Aspects of an embodiment of the invention disclose a method for managing the energy efficiency of servers providing multi-class computing services with Quality of Service (QoS) assurance. The method comprises receiving a plurality of requests from a plurality of devices, sorting the requests into at least three service classes based on the requests' QoS criteria, and assigning each request to one of at least three service queues based on the request's service class. The method further comprises grouping computing resources into at least three groups, where each group has a separate power management policy (PMP) and handles at least one service queue. The power management policies are configured such that each group of computing resources may service requests at an energy efficient point while meeting the QoS criteria of the service class.

Additional embodiments of the present disclosure are directed to a system and a computer program product for managing the energy efficiency of servers providing multi-class computing services with QoS assurance.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present invention and, along with the description, serve to explain the principles of the invention. The drawings are only illustrative of typical embodiments of the invention and do not limit the invention.

DETAILED DESCRIPTION

Figure 1:
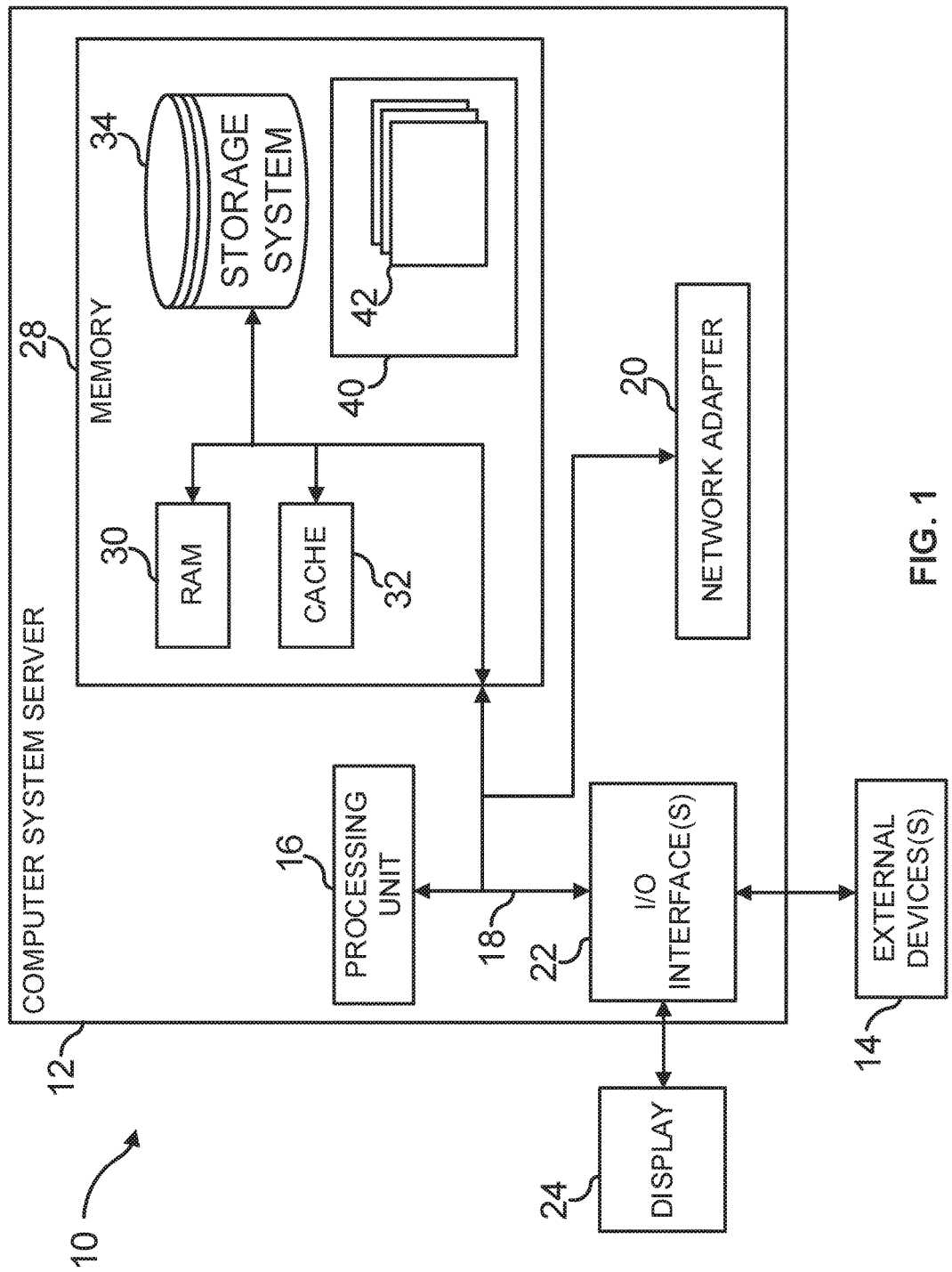
FIG. 1 depicts a cloud computing node, in accordance with an embodiment of the present disclosure.

The present disclosure relates generally to the field of server computing, and more particularly to managing the energy efficiency of servers providing multi-class computing services. While the present disclosure is not necessarily limited to such applications, various aspects of the disclosure may be appreciated through a discussion of various examples using this context.

As used herein, a "device" is any object or machine that may communicate with, and send requests to, a front-end server. Devices may be, e.g., smart phones, tablets, desktop computers, laptop computers, and gaming machines. A "front end server" is any server or software application that can receive incoming requests, sort them into classes based on their Quality of Service (QoS) criteria, and assign them to a service queue. A front end server may be a physical or virtual interface between the devices and the computing resources. The duties of the front end server may be distributed amongst one or more systems. The front end server may be, e.g., a software application running on a computer system.

Class of Service (CoS) is a way of managing traffic in a network by grouping similar types of traffic (for example, e-mail, streaming video, voice, large document file transfer) together and treating each type as a class with its own level of service priority. A "service class" is one of those groups. "Service queue information" is any information about a service queue that may be useful in determining whether the back-end servers are meeting the QoS criteria of the jobs. For example, service queue information may include the queue depth (the number of jobs in the queue), the arrival rate (rate at which new jobs are being assigned to the queue), and the service rate (rate at which jobs in the queue are being processed). A "back-end server" is a group of computing resources assigned to one or more service queues. "Computing resources" are processing units that may handle a service queue. Computing resources may be, e.g., processor cores, central processing units (CPUs), or servers.

A group of computing resources may be operating at "an energy efficient point" when the ratio of its performance of executing tasks to its power consumption is above a predetermined efficiency threshold. In some embodiments, the efficiency threshold may be set by a server admin as the minimum acceptable performance to power ratio for the computing resources. For example, the efficiency threshold may be 5% below the maximum performance to power consumption ratio of the computing resources.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

For example, in an embodiment of the present disclosure, the program modules 42 may include a service queue module, a QoS monitoring module, and a resource and energy management module. The service queue module may include instructions to determine the number of service queues active in the system, receive a request from a device, determine the request's service class based on its QoS criteria, and assign the request to the appropriate service queue. The QoS monitoring module may include instructions to monitor the queue depth of each service queue, and instructions to determine whether the back-end servers are processing the requests fast enough to meet the QoS criteria. The resource and energy management module may include instructions to adjust the power management policies (PMPs) of the back-end servers to ensure that the back-end servers are meeting the QoS criteria of the service queues to which they are assigned, and instructions to ensure that the back-end servers are running at an energy efficient point given the QoS criteria.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

It is noted that FIG. 1 is intended to depict the representative major components of an exemplary computer system/server 12. In some embodiments, however, individual components may have greater or lesser complexity than as represented in FIG. 1, components other than or in addition to those shown in FIG. 1 may be present, and the number, type, and configuration of such components may vary.

Figure 2:
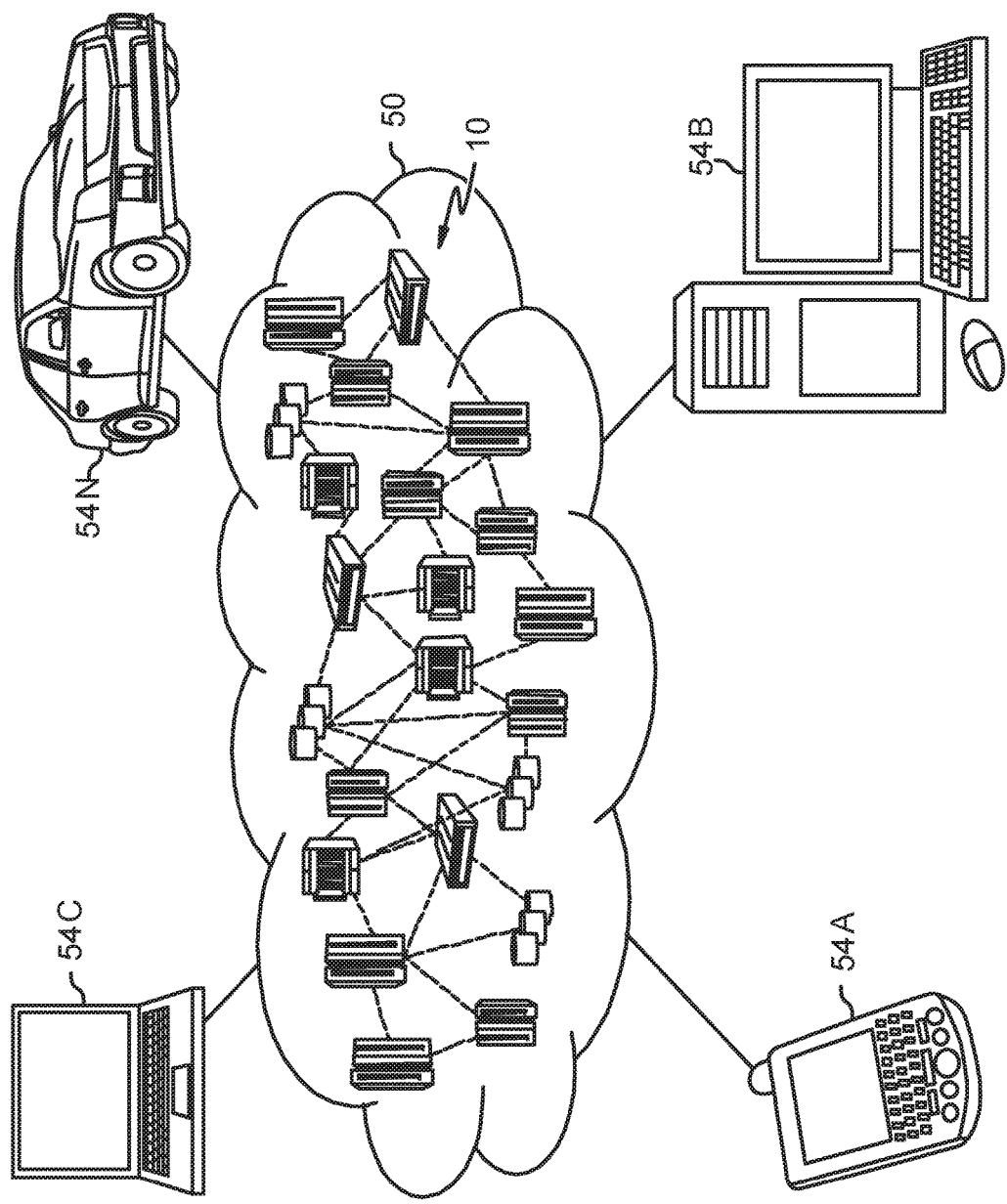
FIG. 2 depicts a cloud computing environment, in accordance with an embodiment of the present disclosure.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
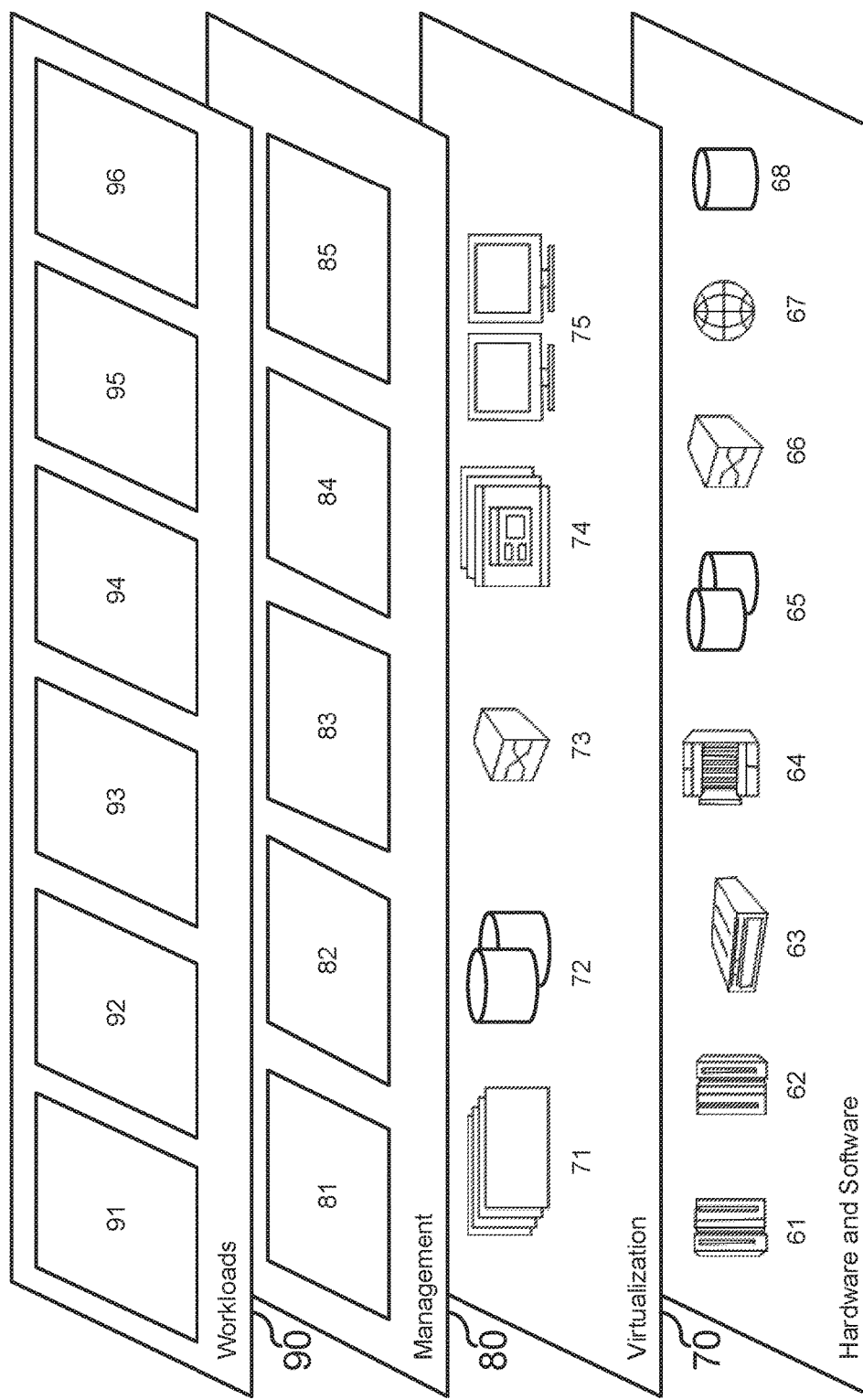
FIG. 3 depicts abstraction model layers, in accordance with an embodiment of the present disclosure.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and mobile desktop 96.

Figure 4:
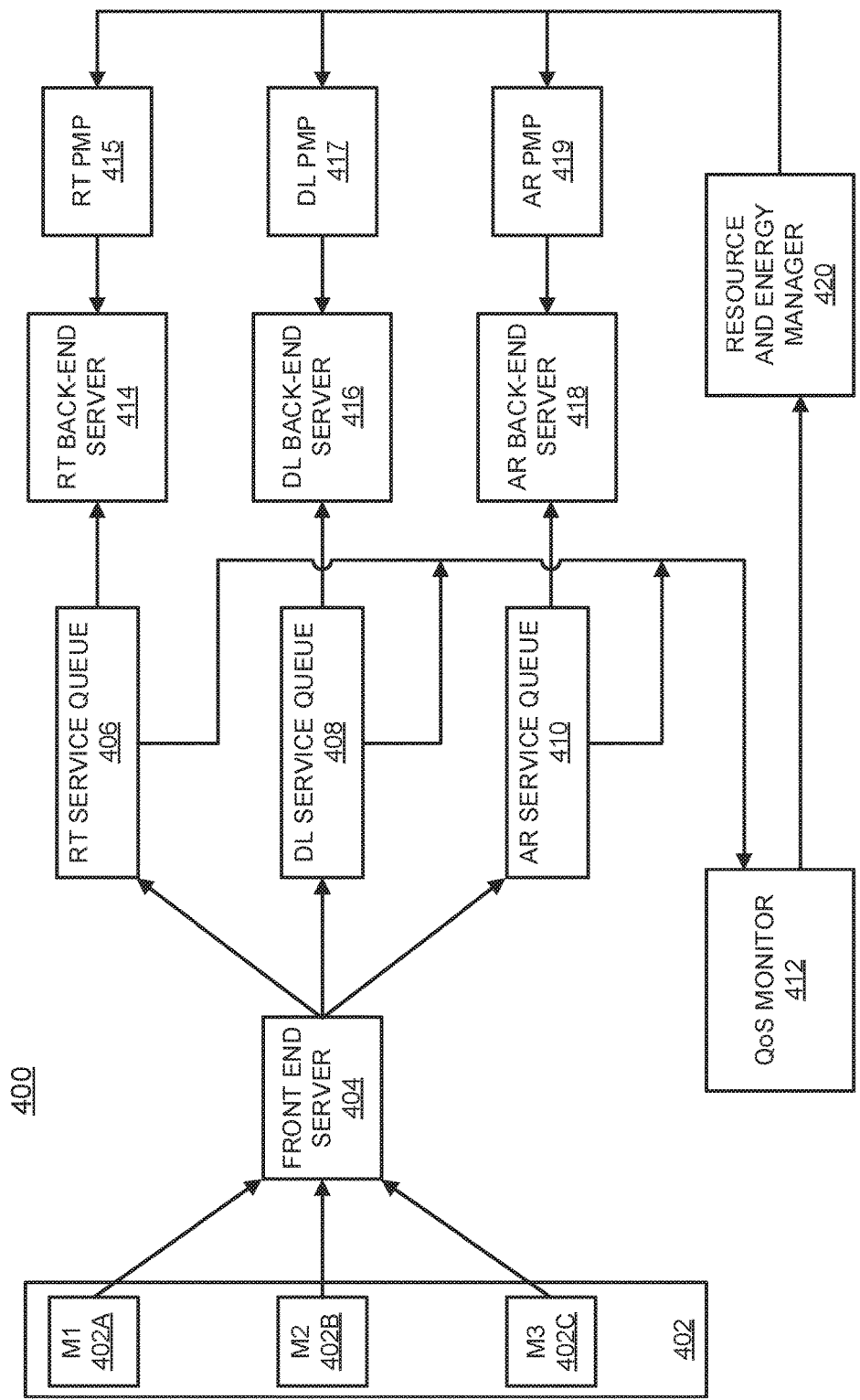
FIG. 4 is a block diagram of exemplary components that may be used in implementing one or more of the methods, tools, and modules, and any related functions, described herein, in accordance with an embodiment of the present disclosure.

Referring now to FIG. 4, shown is a block diagram of exemplary components that may be used in implementing one or more of the methods, tools, and modules, and any related functions, described herein, in accordance with an embodiment of the present disclosure. In some embodiments, the major components may include one or more devices 402A-C, collectively referred to as devices 402, a front-end server 404, a plurality of service queues 406, 408, and 410, a QoS monitor 412, a resource and energy manager 420, a plurality of power management policies 415, 417, and 419, and a plurality of back-end servers 414, 416, and 418.

In the depicted example, the devices 402 may be mobile devices that communicate with the front-end server 404 through a telecommunications networks, e.g., cell phones. In some embodiments, the disclosure may be implemented using a number of different types of communication networks, such as the Internet, an intranet, a local area network (LAN), or a wide area network (WAN). In some embodiments, the devices 402 may include, for example, a cellular telephone, a desktop computer, a laptop computer, a handheld computer, a tablet, a personal digital assistant, or a gaming device.

The devices 402 may connect to the front-end server using wired communication links, wireless communication links, or fiber optic cables. Examples of wireless communication links include shortwave, high frequency, ultra-high frequency, microwave, wireless fidelity (Wi-Fi), Bluetooth technology, global system for mobile communications (GSM), code division multiple access (CDMA), second-generation (2G), third-generation (3G), fourth-generation (4G), or any other wireless communication technology or standard to establish a wireless communications link. It should be noted that the devices 402 may represent any combination of different devices connected to the front-end server 404.

In some embodiments, such as the example depicted in FIG. 4, the present disclosure may be implemented using three service queues: a real-time (RT) service queue 406, a deadline (DL) service queue 408, and an available resources (AR) service queue 410. Requests arrive at the front end server 404 and may be assigned to one of a plurality of service classes based on their QoS criteria. For example, requests with high priority QoS criteria may be assigned to a real-time service class and sent to the real-time service queue 406, where they will receive a real-time response. Real-time service class requests may be requests that require extremely low latency, such as those in support of online gaming, GPS services, mobile commerce, and video streaming. A real-time response is a server response that ensures the back-end server meets the QoS criteria for the real-time service class.

Requests with medium priority QoS criteria, where a small but noticeable latency is acceptable, e.g., web searching, may be assigned to a deadline service class and sent to the deadline service queue 408 and receive a deadline response. A deadline response is a server response that ensures the back-end server meets the QoS criteria for the deadline class. Requests with low priority QoS criteria, such as file downloads, printing services, and background software updates, may be assigned to an available resources service class and may be sent to the available resources service queue 410 where it may receive an available resources response. An available resources response is a server response that ensures the back-end server meets the QoS criteria for the available resources service class. In some embodiments, each service queue may handle a single service class. In other embodiments, multiple service classes may be assigned to a single service queue.

In some embodiments, more service queues may be utilized, and in some embodiments the service queues may be made up of two or more service sub-queues. Each service queue may have an associated back-end server, such as, e.g., back-end servers 414, 416, and 418, that are responsible for handling the requests in the service queue. Each back-end server may have an associated power management policy (PMP) 415, 417, and 419 to ensure the QoS criteria of the requests are met, and to ensure energy efficiency.

The PMPs 415, 417, and 419 are policies set by the resource and energy manager to ensure that QoS criteria are met for each service queue, while maintaining energy efficiency, especially for service queues that do not require a real-time response. The PMPs establish, e.g., the number of active processors and the frequency and voltage of the processors, for each back-end server. For example, in some embodiments the real-time PMP 415 may direct the real-time back-end server 414 to always run all of its computing resources at their maximum frequency and voltage. In other embodiments, the real-time PMP 415 may direct the real-time back-end server 414 to always keep at least one core active and, when a request arrives, run at its highest frequency and voltage.

The deadline PMP 417 may ensure power savings when compared to the real-time PMP. The deadline PMP 417 may, in some embodiments, keep one or more cores active at their minimum frequency (e.g. in standby mode) when no jobs are being processed to ensure power savings. When a job arrives, the deadline PMP 417 may set the deadline back-end server 416 to an energy efficient point that can satisfy the QoS criteria of the job.

The available resources PMP 419 may ensure power savings when compared to the deadline PMP. In some embodiments, the available resources PMP 419 may keep one core in nap or sleep mode when no jobs are being handled to save power. When jobs arrive, the available resources PMP 419 may activate as many cores of the available resources back-end server as is necessary to meet the requests' QoS criteria at an energy efficient point.

In some embodiments, a back-end server may be comprised of processing cores, i.e. cores within a processor. In other embodiments, the back-end servers may instead be one or more central processing units (CPUs). In other embodiments, the back-end servers may be comprised of one or more servers. In still other embodiments, the back-end server may be comprised of some combination of servers, CPUs, and processing cores.

A QoS monitor 412 is responsible for monitoring the queue depth of each service queue and determining whether each service queue's QoS criteria can be met with the current PMP. If a back-end server is not going to meet the QoS criteria of its service queue, the QoS monitor 412 may notify a resource and energy manager 420. The resource and energy manager 420 is responsible for establishing and adjusting the PMPs for each service queue.

The front-end server 404 is responsible for receiving requests from the devices 402 and determining the requests' service class based on its QoS criteria. After determining the requests' service class, the front-end server 404 assigns the requests to the appropriate service queues 414, 416, or 418. The front-end server 404 may be a multi-user mainframe computer system, a single-user system, or a server computer or similar device that has little or no direct user interface, but receives requests from other computer systems (clients). Further, in some embodiments, the front-end server 404 may be implemented as a desktop computer, portable computer, laptop or notebook computer, tablet computer, pocket computer, smart phone, network switches or routers, or any other appropriate type of electronic device.

It is noted that FIG. 4 is intended to depict the representative major components of the present disclosure. In some embodiments, however, individual components may have greater or lesser complexity than as represented in FIG. 4, components other than or in addition to those shown in FIG. 4 may be present, and the number, type, and configuration of such components may vary. For example, in some embodiments, the back-end servers are subcomponents of a single server or mainframe computer.

Figure 5:
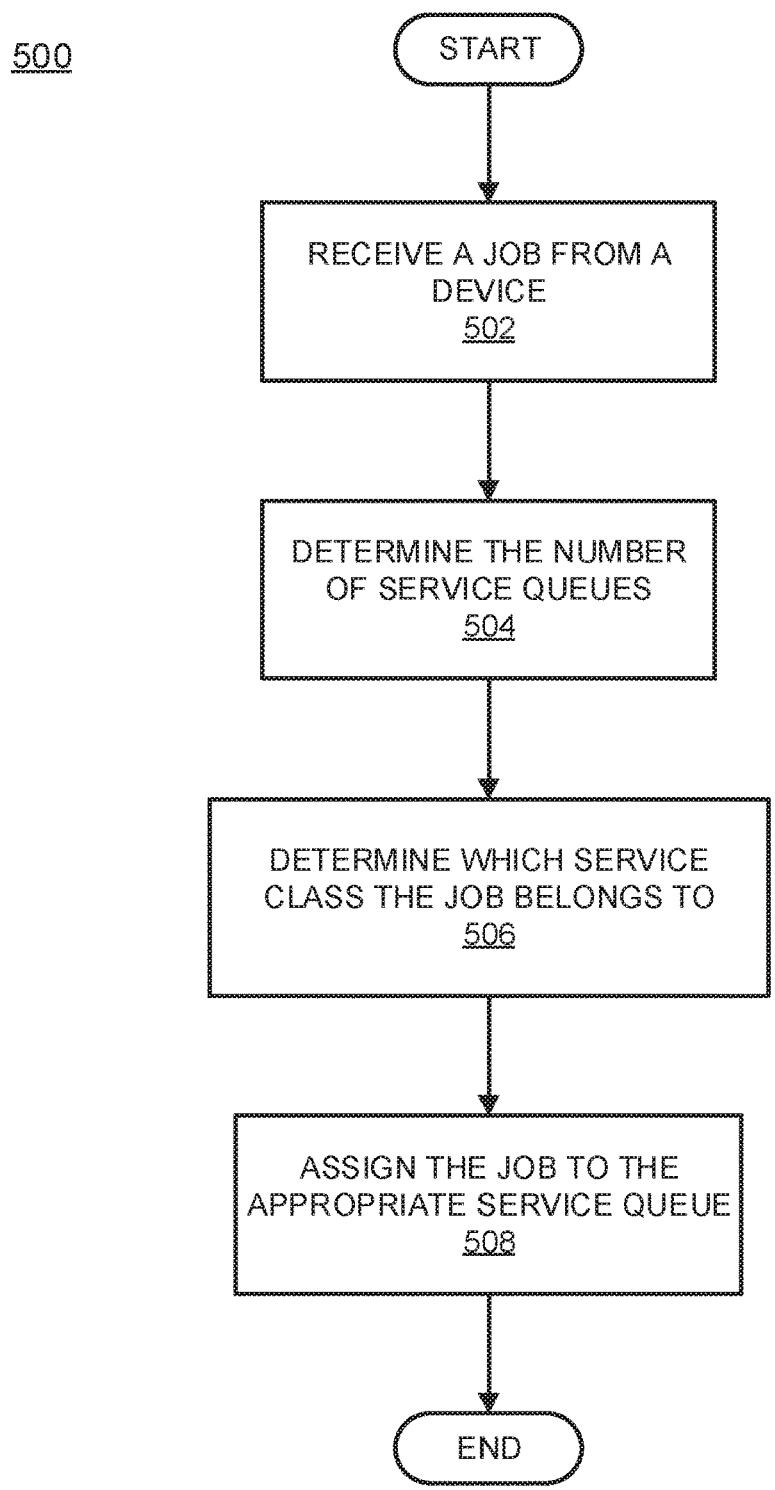
FIG. 5 is a flowchart illustrating a method for assigning incoming requests to service queues based on the requests' Quality of Service (QoS) criteria, in accordance with an embodiment of the present disclosure.

Referring now to FIG. 5, shown is a flowchart illustrating a method 500 for assigning incoming requests to service queues based on the requests' QoS criteria, in accordance with an embodiment of the present disclosure. In some embodiments, the method 500 may be performed by an application running on a front end server 404 (shown in FIG. 4). The method may begin at operation 502, wherein the application may receive an incoming request from a device. At operation 504, the application may determine the number of service queues available or enabled in the system. In some embodiments, the number of service queues may be set by a user. In other embodiments, the number of service queues and service sub-queues may dynamically adjust based on the depth of the service queues.

For example, a system could be configured to initially have three service queues: one for high priority (real-time class) requests, one for medium priority (deadline class) requests, and one for low priority (available resources class) requests. If the service queue for the medium priority requests gets long because, e.g., an unusually high number of deadline class request arrive in a short period of time, the server may respond by adjusting the PMP of the cores servicing the deadline service queue. This may result in a less energy efficient processing of requests, however, because some deadline requests may be serviced faster than necessary in order to get through the backlog. In such circumstances, it may be advantageous to dynamically adjust the number of service queues by splitting the deadline service queue into two distinct sub-queues, each with its own PMP.

A first sub-queue may process deadline class requests that have been waiting longer or require a more immediate response. This first sub-queue may have a first PMP that ensures a faster response than is normal for deadline class requests. A second sub-queue may process deadline class requests that do not require as immediate a response. These could be requests that were more recently added to the deadline service queue, or they may be requests that, while still in the deadline class, inherently require a less immediate response. The second sub-queue may have a second PMP that is normal for, or even more energy efficient than, the normal deadline class PMP. By splitting the deadline class up, the server may be more energy efficient than it would be if the deadline class PMP were adjusted for all requests in the deadline service queue.

After determining the number of service queues at operation 504, the application may determine which service class the received request belongs in at operation 506. As discussed herein, the application may recognize three or more service classes. For example, in some embodiments, at operation 506 the received request may be grouped into a high priority (real-time) class, a medium priority (deadline) class, or a low priority (available resource) class, depending on the QoS criteria of the request.

There are numerous ways in which the application may determine a request's service class at operation 506. In some embodiments, the application may extract a request's header, which may contain a notification of the request's QoS criteria. In other embodiments, the application may look at the account information of the requestor who sent the request. If, for example, the requestor runs an online video game, he may have an account set up so that all requests are given a high priority, real-time response. Many other methods for determining the appropriate service class exist, and the present disclosure should not be limited to any particular method. After determining the request's service class, the application may assign the request to an appropriate service queue at operation 508, and the method may end.

In some embodiments, all the operations in method 500 are performed by the same application on the front-end server. In other embodiments, the operations may be performed by two or more applications running on the front-end server. In yet other embodiments, the operations in method 500 may be performed by two or more servers.

Figure 6:
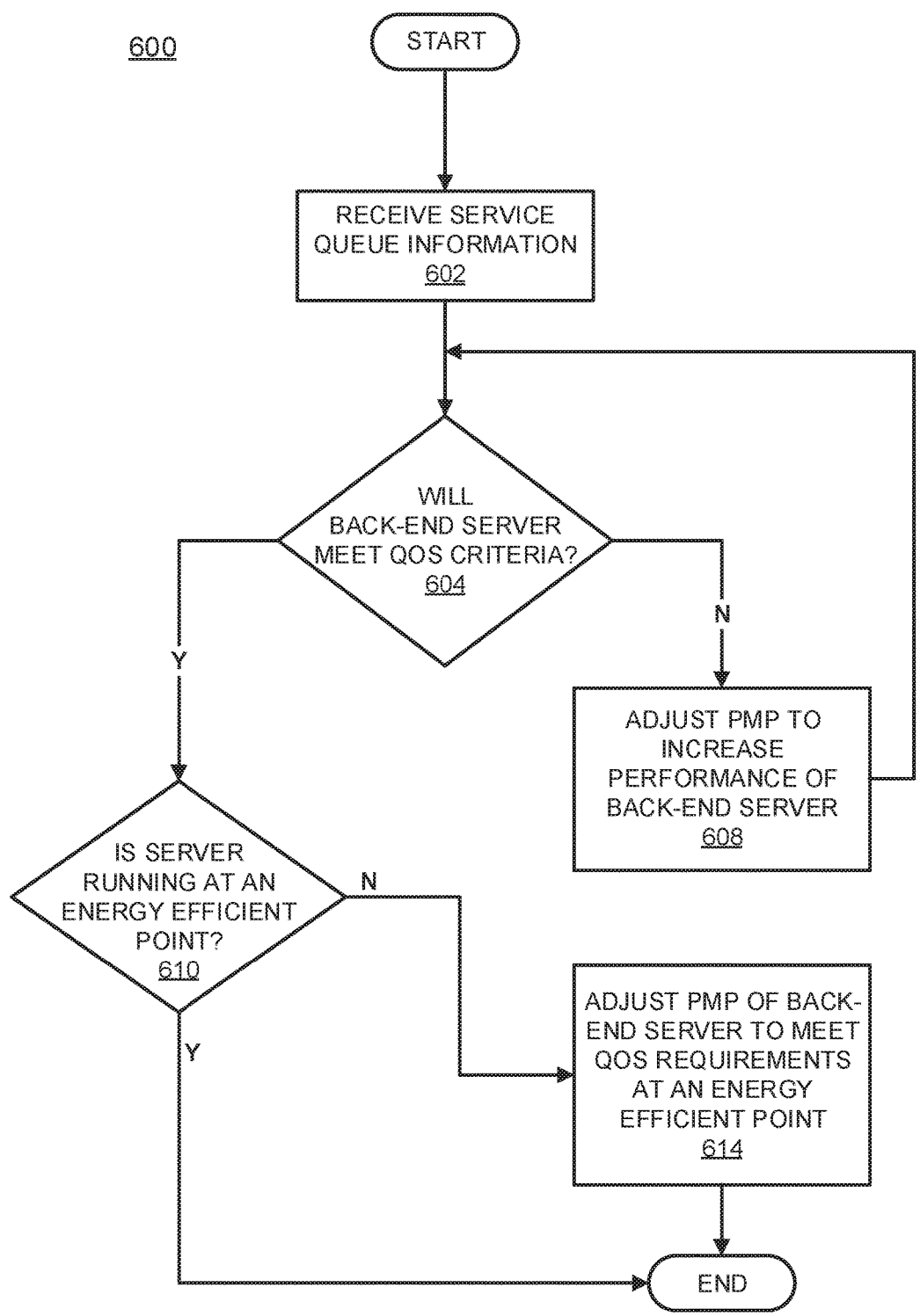
FIG. 6 is a flowchart illustrating a method for adjusting power management policies (PMPs) to manage the energy use in a server with QoS assurance, in accordance with an embodiment of the present disclosure.

Referring now to FIG. 6, shown is a flowchart illustrating a method 600 for adjusting power management policies (PMPs) to manage the energy use in a server while meeting QoS criteria, in accordance with an embodiment of the present disclosure. In some embodiments, the method 600 may be performed by an application running on the front end server 404 (shown in FIG. 4). The method 600 may begin with operation 602, wherein a QoS monitor may receive service queue information.

Using the service queue information, the QoS monitor may determine whether the back-end server handling the service queue will meet the QoS criteria at operation 604. In some embodiments, to determine whether the back-end server will meet the QoS criteria, the QoS monitor may compare the current queue depth (the number of requests in the queue) to the service rate (the rate at which requests are being serviced). In other embodiments, the QoS monitor may check to see if any requests have missed their response requirements. In other embodiments, the QoS monitor may compare the queue depth to a maximum queue depth threshold, which is the maximum number of requests that may be in a queue.

In still other embodiments, the QoS monitor may compare the queue depth, the response time requirements of the service queue, and the arrival rate of requests in the queue. Using Little's Law, the resource and energy manager may determine the average response time of the queue. According to Little's Law, the average response time of the queue, R, is $R=n/\lambda$, where n is the queue depth and $\lambda$ is the average rate of arrival of new requests. The QoS monitor may then compare the average response time to the response time requirements of the service queue. If the average response time is lower, the QoS monitor may determine that QoS criteria are being met. If the average response time is higher, the QoS monitor may determine that QoS criteria are not being met.

If the back-end server is not meeting the QoS criteria of the service queue, the resource and energy manager may adjust the back-end server's PMP to increase the service rate at operation 608. There are a number of ways that the service rate may be increased. In some embodiments, the resource and energy manager may use Dynamic Voltage and Frequency Scaling (DVFS) to raise the frequency of the processors, or processor cores, in the back-end server handling the service queue. In some embodiments, additional cores may be activated (known as core unfolding) in the back-end server to increase the processing power.

In some embodiments, the PMP may be adjusted at operation 608 using DVFS to increase the frequency of the processing cores by a set amount. In other embodiments, the resource and energy manager may predict the frequency necessary to meet QoS criteria using, e.g., Little's Law. Then, the QoS monitor may determine whether the computing resources will meet the QoS criteria per operation 604.

If the back-end server will meet the QoS criteria of the service queue, at operation 610 the resource and energy manager may determine if the back-end server is operating at an energy efficient point. To determine if the back-end server is operating at an energy efficient point, the resource and energy manager may compare the back-end server's computing load to a target load. The target load may be the load at which back-end server operates with its highest performance to power ratio. An energy efficient point may then be the lowest frequency at which the back-end server can sustain the target load.

For example, assume that a back-end server has its highest performance to power ratio when it is operating at a 60% load. If the back-end server is operating at a 40% load, the resource and energy manager may use DVFS to decrease the frequency of the processors. The decreased frequency will increase the load, and will result in lower energy usage. If, however, the back-end server is operating at an 80% load, the resource and energy manager may use DVFS to increase the frequency, thereby reducing the load and increasing the performance to power ratio. In some embodiments, a user may configure the target load for the back-end server.

If the back-end server is running at an energy efficient point, the process may end. If, however, the back-end server is not running at an energy efficient point, the resource and energy manager may adjust the PMP to increase efficiency at operation 614.

There are a number of ways that the efficiency may be increased. In some embodiments, the resource and energy manager may use Dynamic Voltage and Frequency Scaling (DVFS) to lower the frequency of the back-end server's processors, or processor cores. In other embodiments, work may be consolidated onto a subset of the cores, and some cores may be disabled (known as core folding) to decrease the number of active cores running in the back-end server. In still other embodiments, the resource and energy manager may put some cores or processor in a low power mode, such as a nap or sleep mode.

In some embodiments, the frequency may be reduced by a set amount (e.g. 100 MHz) in discrete steps at operation 614. After each reduction in the frequency, the process may resume at operation 604. In other embodiments, the resource and energy manager may predict the appropriate PMP using, e.g., Little's Law. After the PMP has been adjusted to increase efficiency at operation 614, the process may end.

In some embodiments, all the operations in method 600 may be performed by the same application on the front-end server. In other embodiments, the operations in method 600 may be performed by two or more servers. In still other embodiments, the operations may be performed by two or more applications running on the front-end server, or by two or more modules running within the same application. For example, the application executing method 600 may include 3 modules: a service queue module, a QoS monitoring module, and a resource and energy management module.

The service queue module may include instructions to determine the number of service queues active in the system, receive a request from a device, determine the request's service class based on its QoS criteria, and assign the request to the appropriate service queue (i.e. perform method 500). The QoS monitoring module may include instructions to monitor the queue depth of each service queue, and instructions to determine whether the back-end servers are processing the requests fast enough to meet the QoS criteria (i.e. perform operations 602, 604, and 606). The resource and energy management module may include instructions to adjust the power management policies of the back-end servers to ensure that the back-end servers are meeting the QoS criteria of the service queues to which they are assigned, and instructions to ensure that the back-end servers are running at an energy efficient point given the QoS criteria (i.e. perform operations 608, 610, 612, and 614).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of exemplary embodiments of the various embodiments, reference was made to the accompanying drawings (where like numbers represent like elements), which form a part hereof, and in which is shown by way of illustration specific exemplary embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein. Therefore, it is intended that the following claims be interpreted as covering all such alterations and modifications as fall within the true spirit and scope of the invention.

What is claimed is:

1. A method for monitoring groups of computing resources using Quality of Service (QoS) criteria, the method comprising:
   receiving a set of service queue information for a group of computing resources, wherein the set of service queue information includes a queue depth and an arrival rate;
   determining one or more QoS criteria for the group of computing resources, wherein the QoS criteria includes a maximum average response time for incoming requests processed by the group of computing resources;
   determining, based on the QoS criteria and the set of service queue information for the group of computing resources, whether the group of computing resources will meet the QoS criteria, wherein determining whether the group of computing resources will satisfy the QoS criteria comprises:
      determining an average response time for the incoming requests using the queue depth and the arrival rate; and
      comparing the average response time to the QoS criteria;
   adjusting, in response to determining that the group of computing resources will not meet the QoS criteria, a power management policy (PMP) of the group of computing resources to increase performance of the group of computing resources;
   receiving a request with a QoS criterion, the QoS criterion indicating a level of priority of the request;
   determining, in response to receiving the request and based on the QoS criterion of the request, a service class for the request;
   determining that the group of computing resources is associated with the service class for the request, wherein the group of computing resources is one of a plurality of groups of computing resources; and
   storing the request in a service queue for the group of computing resources.

2. The method of claim 1, the method further comprising:
   determining, in response to receiving an incoming job from a device, a number of service queues available;
   determining that the incoming job belongs to a particular service class using an extracted header of the incoming job and requester information; and
   queueing the incoming job to the group of computing resources based on the particular service class.

3. The method of claim 2, the method further comprising:
   determining, using the set of service queue information for the group of computing resources, that the queue depth for the group of computing resources exceeds a threshold;
   splitting the service queue for the group of computing resources into a first sub-queue and a second sub-queue, the first sub-queue having a first QoS requirement, the second sub-queue having a second QoS requirement, the first QoS requirement establishing a faster response time than the second QoS requirement;
   assigning a first set of requests to the first sub-queue and a second set of requests to the second sub-queue based on when the first and second sets of requests were placed in the service queue for the group of computing resources;
   determining a first frequency of one or more processors in the group of computing resources, the first frequency being a predicted frequency required to process the first set of requests according to the first QoS requirement;
   establishing a first PMP for the first sub-queue using the first frequency, the first PMP being configured to ensure that the first set of requests are processed according to the first QoS requirement;
   determining a second frequency of one or more processors in the group of computing resources, the second frequency being a predicted frequency required to process the second set of requests according to the second QoS requirement;
   establishing a second PMP for the second sub-queue using the second frequency, the second PMP being configured to ensure that the second set of requests are processed according to the second QoS requirement;
   processing the first set of requests according to the first QoS requirement; and
   processing the second set of requests according to the second QoS requirement.

4. The method of claim 1, the method further comprising:
   determining, in response to determining that the group of computing resources will meet the QoS criteria, whether the group of computing resources is running at an energy efficient point; and
   adjusting, in response to determining that the group of computing resources are not running at the energy efficient point, the PMP of the group of computing resources to increase efficiency.

5. The method of claim 4, wherein adjusting the PMP for the group of computing resources to increase the efficiency of the group of computing resources comprises consolidating work onto few processor cores using processor folding and placing one or more processor cores in a low power mode.

6. The method of claim 1,
   wherein each group of computing resources includes one or more processors and one or more computer readable storage media, wherein each group of computing resources is associated with a service class, wherein the plurality of groups of computing resources include a first group of computing resources configured to process requests according to a first time threshold, a second group of computing resources configured to process requests according to a second time threshold, and a third group of computing resources configured to process requests according to a third time threshold, and wherein the first time threshold is smaller than the second and third time thresholds, and the second time threshold is smaller than the third time threshold.

7. The method of claim 1, wherein there are at least three groups of computing resources, each group of computing resources being associated with a different service class, the groups of computing resources including a first group supporting a real-time response and having a first PMP ensuring the real-time response, a second group supporting a deadline response having a second PMP ensuring the deadline response with power saving improvements compared to the first PMP, and a third group supporting an available resources response having a third PMP with power saving improvements compared to the second PMP.

8. The method of claim 7, the method further comprising:
receiving a particular request;
determining that the particular request corresponds to a service class processed by the third group of computing resources according to the third PMP, wherein the third PMP includes keeping one processor core in a low power mode and remaining processor cores in an inactive mode when no requests are in a queue serviced by the third group of computing resources;
queuing the particular request in the queue serviced by the third group of computing resources;
determining, in response to queuing the particular request in the queue serviced by the third group of computing resources, a number of processor cores necessary to meet the QoS criteria for the third group of computing resources;
activating one or more processor cores such that a number of active processor cores matches the number of processor cores necessary to meet the QoS criteria for the third group of computing resources; and
processing the particular request using the one or more activated processor cores.

9. A computer program product comprising a computer readable storage medium having program instructions embodied therewith, the program instructions executable by a processor to cause the processor to perform a method comprising:
receiving a set of service queue information for a group of computing resources, wherein the set of service queue information includes a queue depth and an arrival rate;
determining one or more QoS criteria for the group of computing resources, wherein the QoS criteria includes a maximum average response time for incoming requests processed by the group of computing resources;
determining, based on the QoS criteria and the service queue information for the group of computing resources, whether the group of computing resources will meet the QoS criteria wherein determining whether the group of computing resources will satisfy the QoS criteria comprises:
determining an average response time for the incoming requests using the queue depth and the arrival rate; and
comparing the average response time to the QoS criteria;
adjusting, in response to determining that the group of computing resources will not meet the QoS criteria, a power management policy (PMP) of the group of computing resources to increase performance of the group of computing resources;
receiving a request with a QoS criterion, the QoS criterion indicating a level of priority of the request;
determining, in response to receiving the request and based on the QoS criterion of the request, a service class for the request;
determining that the group of computing resources is associated with the service class for the request, wherein the group of computing resources is one of a plurality of groups of computing resources; and
storing the request in a service queue for the group of computing resources.

10. The computer program product of claim 9, wherein the method performed by the processor further comprises:
determining, in response to receiving an incoming job from a device, a number of service queues available;
determining that the incoming job belongs to a particular service class using an extracted header of the incoming job and requester information; and
queueing the incoming job to the group of computing resources based on the particular service class.

11. The computer program product of claim 10, wherein the method performed by the processor further comprises:
determining, using the set of service queue information for the group of computing resources, that the queue depth for the group of computing resources exceeds a threshold;
splitting the service queue for the group of computing resources into a first sub-queue and a second sub-queue, the first sub-queue having a first QoS requirement, the second sub-queue having a second QoS requirement, the first QoS requirement establishing a faster response time than the second QoS requirement;
assigning a first set of requests to the first sub-queue and a second set of requests to the second sub-queue based on when the first and second sets of requests were placed in the service queue for the group of computing resources;
determining a first frequency of one or more processors in the group of computing resources, the first frequency being a predicted frequency required to process the first set of requests according to the first QoS requirement;
establishing a first PMP for the first sub-queue using the first frequency, the first PMP being configured to ensure that the first set of requests are processed according to the first QoS requirement;
determining a second frequency of one or more processors in the group of computing resources, the second frequency being a predicted frequency required to process the second set of requests according to the second QoS requirement;
establishing a second PMP for the second sub-queue using the second frequency, the second PMP being configured to ensure that the second set of requests are processed according to the second QoS requirement;
processing the first set of requests according to the first QoS requirement; and processing the second set of requests according to the second QoS requirement.

12. The computer program product of claim 9, wherein the method performed by the processor further comprises:
   determining, in response to determining that the group of computing resources will meet the QoS criteria, whether the group of computing resources is running at an energy efficient point; and
   adjusting, in response to determining that the group of computing resources are not running at the energy efficient point, the PMP of the group of computing resources to increase efficiency.

13. The computer program product of claim 12, wherein adjusting the PMP for the group of computing resources to increase the efficiency of the group of computing resources comprises consolidating work onto few processor cores using processor folding and placing one or more processor cores in a low power mode.

14. The computer program product of claim 9,
   wherein each group of computing resources includes one or more processors and one or more computer readable storage media,
   wherein each group of computing resources is associated with a service class,
   wherein the plurality of groups of computing resources include a first group of computing resources configured to process requests according to a first time threshold, a second group of computing resources configured to process requests according to a second time threshold, and a third group of computing resources configured to process requests according to a third time threshold, and
   wherein the first time threshold is smaller than the second and third time thresholds, and the second time threshold is smaller than the third time threshold.

15. The computer program product of claim 9, wherein there are at least three groups of computing resources, each group of computing resources being associated with a different service class, the groups of computing resources including a first group supporting a real-time response and having a first PMP ensuring the real-time response, a second group supporting a deadline response having a second PMP ensuring the deadline response with power saving improvements compared to the first PMP, and a third group supporting an available resources response having a third PMP with power saving improvements compared to the second PMP.

16. The computer program product of claim 15, wherein the method performed by the processor further comprises:
   receiving a particular request;
   determining that the particular request corresponds to a service class processed by the third group of computing resources according to the third PMP, wherein the third PMP includes keeping one processor core in a low power mode and remaining processor cores in an inactive mode when no requests are in a queue serviced by the third group of computing resources;
   queuing the particular request in the queue serviced by the third group of computing resources;
   determining, in response to queuing the particular request in the queue serviced by the third group of computing resources, a number of processor cores necessary to meet the QoS criteria for the third group of computing resources;
   activating one or more processor cores such that a number of active processor cores matches the number of processor cores necessary to meet the QoS criteria for the third group of computing resources; and
   processing the particular request using the one or more activated processor cores.

* * * * *